United States Patent
Gung et al.

(10) Patent No.: US 6,816,839 B1
(45) Date of Patent: Nov. 9, 2004

(54) DEMAND PLANNING FOR CONFIGURE-TO-ORDER AND BUILDING BLOCKS-BASED MARKET ENVIRONMENT

(75) Inventors: Roger R. Gung, Yorktown Heights, NY (US); Jonathan R. Hosking, Scarsdale, NY (US); Grace Y. Lin, Chappaqua, NY (US); Akira Tajima, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,190

(22) Filed: May 4, 2000

(51) Int. Cl.[7] .............................................. G06F 17/60
(52) U.S. Cl. ............................. 705/10; 705/7; 705/28; 705/29
(58) Field of Search ........................... 705/10, 7, 28, 705/29

(56) References Cited

U.S. PATENT DOCUMENTS

| | | | | |
|---|---|---|---|---|
| 5,307,261 A | * | 4/1994 | Maki et al. | 705/29 |
| 5,974,395 A | * | 10/1999 | Bellini et al. | 705/10 |
| 6,009,406 A | * | 12/1999 | Nick | 705/10 |
| 6,047,331 A | * | 4/2000 | Medard et al. | 709/239 |
| 6,119,102 A | * | 9/2000 | Rush et al. | 705/29 |
| 6,151,582 A | * | 11/2000 | Huang et al. | 705/10 |
| 6,157,915 A | * | 12/2000 | Bhaskaran et al. | 705/1 |
| 6,167,380 A | * | 12/2000 | Kennedy et al. | 705/10 |
| 6,321,212 B1 | * | 11/2001 | Lange | 705/1 |
| 6,611,726 B1 | * | 8/2003 | Crosswhite | 700/99 |

OTHER PUBLICATIONS

PR Newswire, i2 Technologies Introduces Consumer Goods MArket–Specific Supply Chain Solutions, May 21, 1997, PR Newswire. [DIALOG: Fele 621].*

Zarley, Craig, Countdown to Compaq Channel Assembly, Jan. 12, 1998, Computer Reseller News, n771, pp. 77–78 [DIALOG: File 15].*

* cited by examiner

*Primary Examiner*—Tariq R. Hafiz
*Assistant Examiner*—Andre Boyce
(74) *Attorney, Agent, or Firm*—Whitham, Curtis & Christofferson, P.C.; Stephen C. Kaufman

(57) ABSTRACT

A method for demand planning of products. The method comprises the steps of constructing a configure-to-order operation/multiple building block environment; and, forecasting the demand of the building blocks within this environment for establishing an efficient supply chain management.

4 Claims, 5 Drawing Sheets

Figure 1:
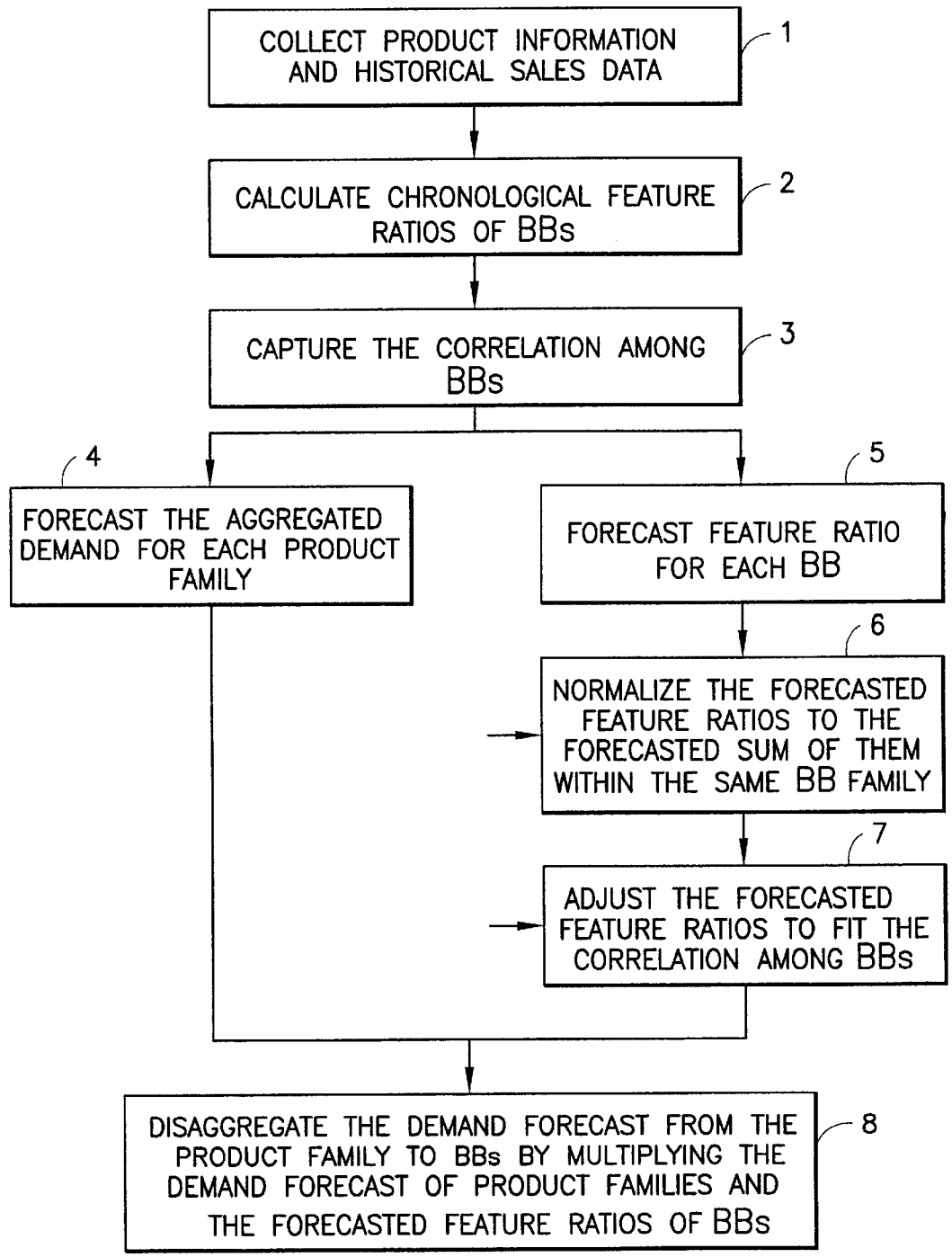

DEMAND PLANNING FOR CONFIGURE-TO-ORDER AND BUILDING BLOCKS-BASED MARKET ENVIRONMENT

FIELD OF THE INVENTION

This invention relates to a method for forecasting the demand of products with multiple options, to be used for establishing an efficient supply chain management framework by providing an accurate demand forecast of each attachment.

BACKGROUND OF THE INVENTION

New technology advance, rapid market condition changes, and growing customer demands have dramatically changed the landscape of the electronic industry. While product life cycles get shorter, prices continue to drop, and profit margins become paper-thin, customers are demanding faster and more reliable delivery of highly customized products. On the supply side, a globalized market, coupled with long component lead times, only adds to the challenges. In order to succeed in this complex environment, companies have to improve their speed, efficiency, and customer experiences by exploring different business models and increasing supply chain flexibility. This has resulted in recent trends in direct market business model, global information technology systems, mass customization, configure-to-order (CTO) operation, supply chain collaboration, and end-to-end supply chain optimization. In the new economy, a supply chain can be viewed as a network of enterprises linked either loosely or tightly together to produce and move the goods through the pipeline to reach customers. By coordinating and managing the flow of information, material, and control in a supply chain, total supply chain uncertainty can be reduced dramatically. Reports have shown that leading companies with best-in-class supply chain management can have a 7% cost advantage, a 40% to 65% advantage in cash-to-cash cycle time, 50% to 80% inventory reduction, and at the same time, achieve better customer service level and satisfaction.

SUMMARY OF THE INVENTION

A critical aspect in the supply chain uncertainty reduction is the demand forecast. The bull-ship effect examined by Lee et. al. demonstrated how forecast errors were amplified through the supply chain and caused supply chain inefficiency. Studies by Ett et. al. and Lin et. al. also showed the significant impacts of the forecasting accuracy to the overall supply chain performance. It is clear that forecasting should be an integral part of the supply chain management.

The electronic industry traditionally has adopted a build-to-forecast process. The process is sometimes referred to as the "machine-type model" (MTM) operation. In this process, there is a set of predefined end products, or MTM's. Demand forecasts over a future planning horizon are generated for each MTM, and updated periodically for each planning cycle (this is typically a weekly cycle). A "materials requirements planning" (MRP) type explosion technique is then used to determine the requirements for the components over the planning horizon, based on the bill-of-materials structure of each end product. The entire supply chain planning and manufacturing plan are based on the forecasts and the interactions between the forecast. The supply chain operations are limited to the periodical forecast adjustments. Products are then built according to the forecast. Because of the random variation and unavoidable error involved in demand forecasts, excessive inventory is usually kept at the end product level. However, holding finished goods inventory for any length of time is very costly for products with a short life cycle and a frequent price reduction. This type of MTM operation is being migrated to a web-based configure-to-order operation where customer orders will be taken from the internet. Instead of a set of predefined machine type models, customers can configure the products with multiple options over the web based tool on a set of components or Building Blocks (BB) without violating the technological constraints. This model offers higher product variety, and hence, can result in a better customer satisfaction, broader market coverage, and higher demand volume. There is also a potential revenue and profit benefit from the increased market coverage and the leverage of profit multipliers. In the CTO/BB environment, no finished goods inventory will be kept and the inventory management focus is shifted to the components of "building blocks", which are still built based on the build-to-forecast scheme, due to their long lead-times. The number of different finished products based on the feasible combinations of the building blocks is quite large. It is very difficult, if not impossible, to forecast well the demands for each feasible combination of the building blocks as it is done in the simpler MTM environment. In this invention, we present a method to accurately forecast the demand of building blocks, in a CTO/BB environment, to be used for establishing efficient supply chain management.

Accordingly, in a first aspect of the present invention, we disclose a method for demand planning of products, the method comprising the steps of:

1) constructing a configure-to-order operation/multiple building block environment; and 2) forecasting the demand of the building blocks within this environment for establishing an efficient supply chain management.

Preferably, the demand for forecasting building blocks comprises a step of focusing on the sales volume of each building block.

Preferably, the demand for forecasting building blocks comprises the step of considering a sales volume of a product family and the feature ratios of the building blocks. For example, step 2 may comprise normalizing feature ratios within a building block family. Preferably, step 2 comprises using dependencies among building block families comprising a pairwise correlation between any two building block families. For example, this may comprise a step of approximating the pairwise correlation relationship with a spanning tree. The method, in this regard, may advantageously comprise a step of propagating an adjustment by tracing the spanning tree by starting from the most dominant building block family. For example, the method usefully includes the steps of using mutual information as an index for the pairwise correlation and fitting a joint distribution for the building blocks to be consistent with the pairwise correlation.

In a second aspect of the present invention, we disclose a program storage device readable by a machine, tangibly embodying a program of instructions excutable by the machine to perform method steps for demand planning of products, the method comprising the steps of:

1) constructing a configure-to-order operation/multiple building block environment; and 2) forecasting the demand of the building blocks within this environment for establishing an efficient supply chain management.

With respect to the invention as just summarized in both its first and second aspects, we now provide the following additional instruction.

There are two approaches for forecasting the demands of building blocks. One is the plain approach, which just focuses on the sales volume of each building block, regards it as a scalar value independent of other values, and applies a statistical forecast to it. The other is the top-down approach, which consider the sales volume of the product family and the feature ratios of the building blocks. The sales volume of a building block is obtained by multiplying the total sales volume and the ratio corresponding to the building block. In this case, we need to forecast the sales volume of the product family and the feature ratios for the building blocks.

On the other hand, there are dependencies among the choices of building blocks from multiple building block families, for example, a customer who selects a fast CPU tends to select a large memory module. These have never been addressed so far within the two approaches above, because existing statistical forecasting technologies mainly focus on one scalar value. Further, the forecasted demand is not always accepted as it is, rather adjusted afterwards based on external constraints including price change, inventory status, and competitors performance. Here the dependencies are not sufficiently considered. Therefore capturing the dependencies among building blocks can provide not only a more accurate forecast but a way to support business decisions. This invention does it by combining methodologies of statistical forecast, categorical data analysis, and information theory.

Forecasts of feature ratios for building blocks of two or more building block families are made separately for each building block family. Further, if we consider the dependencies among these building block families, we also forecast jointly for combinations of building block families for the different components. For example, forecasts may be required both for hard drive building blocks (small, medium, and large, say) and CPU building blocks (slow and fast, say), and also for each combination of hard drive and CPU building blocks (small/slow, small/fast, etc.). In general, these forecasts need to be adjusted to make them mutually consistent.

In statistical terminology this problem is one of adjusting the cells of a contingency table (or the joint distribution, in information theoretic terminology) to achieve consistency with specified marginal totals of the contingency table. A well-known algorithm for this problem is the Iterative Proportional Fitting algorithm, also known as "raking", of Deming and Stephan (1940), which iteratively rescale the contingency table vertically and horizontally in turn, to make it fit to the marginal totals. Ireland and Kullback (1968) showed that the Iterative Proportional Fitting algorithm obtains a contingency table consistent with the marginal totals and closest to the original contingency table in a certain distance measure. An alternative approach to ensuring consistency of forecasts is to regard one component as more fundamental than the other and to adjust the cell values to agree with the marginal totals only for the more fundamental component. If Component A is regarded as fundamental, one would adjust the cell values to be consistent with the marginal totals for Component A only, and derive forecasts for feature ratios for Component B from the adjusted cell values.

In order to capture the dependencies among building blocks more exactly, we not only consider the joint distribution, but also consider the mutual information of the joint distribution of feature ratios for components A and B, and require the adjusted forecasts to have the same value for their mutual information.

In this invention we can utilize a statistical forecast model as a black box, and there are many existing statistical forecast models such as Box-Jenkins models, time-series models, line at regression, and exponential smoothing models. Refer to Montgomery and Johnson (1976), for example.

REFERENCES

W. E. Deming and F. F. Stephan (1940). On a least squares adjustment of a sampled frequency table when the expected marginal tables are known. *Annals of Mathematical Statistics,* 11, 427–444.

C. T. Ireland and S. Kullback (1968). Contingency tables with given marginals. *Biometrika,* 55, 179–188.

D. C. Montgomery and L. A. Johnson(1976). Forecasting and Time Series Analysis. McGraw-Hill Book Company.

BRIEF DESCRIPTIONS OF THE DRAWING

The invention is illustrated in the accompanying drawing, in which:

FIG. 1 provides a flowchart summarizing an illustrative method of the present invention; and FIGS. 2–5 provide details subsumed by the FIG. 1 flowchart.

DETAILED DESCRIPTION OF THE INVENTION

This invention implements a method for demand planning of products with multiple building block families. The invention is an extension to the top-down approach, namely, first forecast the total volume of a product, then obtain the forecast of each building blocks based on the forecasted feature ratios. The difference exists in the way feature ratios are forecasted.

The novel invention includes capabilities and methodologies for maintaining the dependencies among building block families on forecasting the demand, and further preserving the dependencies in the succeeding planning phase, which result in a demand planning system with more accurate forecast and a novel function of propagating the adjustment on feature ratios of building blocks to other building blocks.

Overall Methodology

Referring to the drawings, and more particularly to FIG. 1, there is shown a block diagram (numerals 1–8) of the overall organization of building blocks-based demand forecasting.

The overall flow begins, in block 1, with collecting the product information, production specification (CTO BOM), and historical sales records from existing databases.

In block 2, chronological feature ratios of building blocks within each product family are calculated based on historical sales data.

In block 3, the correlation indices (i.e. mutual information) among building block families with respect to the order quantities are calculated based on historical sales data.

In block 4, the demand quantity of each product family is forecasted based on historical aggregated order quantities that are aggregated in the product family level.

In block 5, the feature ratio of each building block within each product family is forecasted based on historical feature ratios that are calculated in block 2. The sum of feature ratios of the building blocks that belong to the same building block family is also forecasted based on historical feature ratios. Usually a product contains only one building block from a building block family. For example, a PC can only have one operating system, such as Windows 98, from operating system family. In this case, the sum of feature ratios of building blocks at a period is the unity. The forecasted sum will be the unity. TABLE 1 shows an example of a building block family BB with 3 building blocks (BB1, BB2, and BB3) where, based on historical feature ratios, the forecasted feature ratios of BB1, BB2, and BB3 are 0.3212, 0.3092, and 0.4474. The sum is 1.0778. However, based on the historical sums, the forecasted sum is 1.0582.

In block 6, the forecasted feature ratios of the building blocks that belong to the same building block family are normalized to their forecasted sum such that the sum of forecasted feature ratios is equal to their forecasted sum. Following the same example in TABLE 1, TABLE 2 shows that the forecasted feature ratio of each building block is adjusted by multiplying the ratio of 1.0582 to 1.0778. Therefore the sum of the forecasted feature ratios is adjusted to 1.0582.

In block 7, the forecasted feature ratios of building blocks are adjusted using the correlation model described in the next section, in order to maintain the correlation indices that are calculated in block 3.

In block 8, the projected demand quantity of each building block within each product family is calculated by multiplying the forecasted demand quantity of the product family with the forecasted feature ratio of the building block. Following the same example in TABLE 1 and 2, TABLE 3 shows an extended example where, based on historical demand quantities of the product family, the forecasted demand quantity of the product family is 3524 units. Considering the correlation indices among building block families, the forecasted feature ratios of BB1, BB2, and BB3 are adjusted to 0.3159, 0.3021, and 0.4402. Therefore the forecasted demand quantities of BB1, BB2, and BB3 can be obtained by multiplying 3524 units with adjusted feature ratios.

Correlation Model

In this invention, we consider product families with multiple families of building blocks (BBs), each of which has several alternatives chosen by the customer on order. For example, a PC model has CPUs, hard disk drives, memory modules and so on as BB families. We present a method for forecasting the demand of the BBs in a more accurate and flexible way by making use of the dependencies among BB families.

Suppose we focus on a product with m building block families, and each building block family $B^i (0 \leq i \leq m)$ has $d^i$ candidates to be selected by the customer. Then we can consider feature ratios for $B^i$ as a $d^i$-dimensional vector $\{f^i | f^{i^T} \cdot 1 = 1.0\}$.

The forecasted demand of the product $\hat{D}_{n+1}$ is obtained from historical sales $D_t(1 \leq t \leq n)$ by a statistical forecast, and the feature ratio $\hat{f}^i_{n+1}$ is also obtained from $f^i_t(1 \leq t \leq n)$. The demand of each component of $B^i$ can be obtained from $\hat{D}_{n+1}$ and $\hat{f}^i_{n+1}$.

Here we introduce a concept of pairwise joint distribution, $J^{ij}$, which represents the joint occurrence of two building block families $B^i$ and $B^j$. It is a two-dimensional matrix of size $d^i \times d^j$ and satisfies $1^T \cdot J^{ij} \cdot 1 = 1.0$, $1^T \cdot J^{ij} = f^{i^T}$, and $J^{ij} \cdot 1 = f^i$.

Generally, $J^{ij} = f^i \times f^j$ does not hold because of the correlation between the BB families such as a customer who selects a fast CPU tends to selects a large hard file. To measure such a correlation, we introduce an information theoretical index called mutual information $I^{ij}$, defined as $I^{ij} = H^i + H^j - H^{ij}$, where $H_S$ represent the entropy when we regard $f^i$, $f^j$, and $J^{ij}$ as probability distributions (Entropy is defined as $$H = -\sum_k p_k \log_2 p_k$$

The mutual information is equal to zero if there is no correlation, and has a positive value otherwise.

We also consider a complete graph G(V, E) where each element of node set V corresponds to a BB family and |V|=m. and arcs are defined for all pairs of nodes. We assign a weight of $I^{ij}$ to the arc whose end nodes correspond to $B^i$ and $B^j$.

Procedures of Using Correlation Model

We present the procedures to obtain the forecast of each BB demand, and to adjust the forecasted demand, both in a way that preserves the correlation among BBs.

Procedure 1: Initializations

Step 1. Obtain the mutual information value $I^{ij}$ of all pairs of BB families from historical sales data. It can be the average of all the periods in history, or can be forecasted as $\hat{I}^{ij}_{n+1}$ from $I^{ij}_t(1 \leq t \leq n)$ by using statistical forecast.

Step 2. Construct a spanning tree T whose nodes correspond to BB families. How to construct T is arbitrary, it can be decided based on the domain knowledge such that CPU is the most dominant BB family in PC, or the maximum weighted spanning tree that is constructed in a greedy way can be used instead.

TABLE 1

| Period | 1 | 2 | 3 | 4 | 5 | Current |
|---|---|---|---|---|---|---|
| BB1 feature ratio | 0.3324 | 0.3009 | 0.3313 | 0.2903 | 0.3233 | 0.3212 |
| BB2 feature ratio | 0.2921 | 0.3112 | 0.2831 | 0.2994 | 0.3018 | 0.3092 |
| BB3 feature ratio | 0.4573 | 0.4338 | 0.4289 | 0.4559 | 0.4283 | 0.4474 |
| Sum of feature ratio | 1.0818 | 1.0459 | 1.0433 | 1.0456 | 1.0534 | 1.0582 |

TABLE 2

| Period | 1 | 2 | 3 | 4 | 5 | Current |
|---|---|---|---|---|---|---|
| BB1 feature ratio | 0.3324 | 0.3009 | 0.3313 | 0.2903 | 0.3233 | 0.3154 |
| BB2 feature ratio | 0.2921 | 0.3112 | 0.2831 | 0.2994 | 0.3018 | 0.3036 |
| BB3 feature ratio | 0.4573 | 0.4338 | 0.4289 | 0.4559 | 0.4283 | 0.4393 |
| Sum of feature ratio | 1.0818 | 1.0459 | 1.0433 | 1.0456 | 1.0534 | 1.0582 |

TABLE 3

| Period | 1 | 2 | 3 | 4 | 5 | Current | Qty. |
|---|---|---|---|---|---|---|---|
| Demand quantity of product family | 3392 | 3409 | 3484 | 3553 | 3512 | 3524 | |
| BB1 feature ratio | 0.3324 | 0.3009 | 0.3313 | 0.2903 | 0.3233 | 0.3159 | 1024 |
| BB2 feature ratio | 0.2921 | 0.3112 | 0.2831 | 0.2994 | 0.3018 | 0.3021 | 1065 |
| BB3 feature ratio | 0.4573 | 0.4338 | 0.4289 | 0.4559 | 0.4283 | 0.4402 | 1551 |
| Sum of feature ratios | 1.0818 | 1.0459 | 1.0433 | 1.0456 | 1.0534 | 1.0582 | |

Step 3. Select the root of T, and let r denote the suffix of the corresponding BB family. Namely, the root node corresponds to $B^r$.

Figure 2:
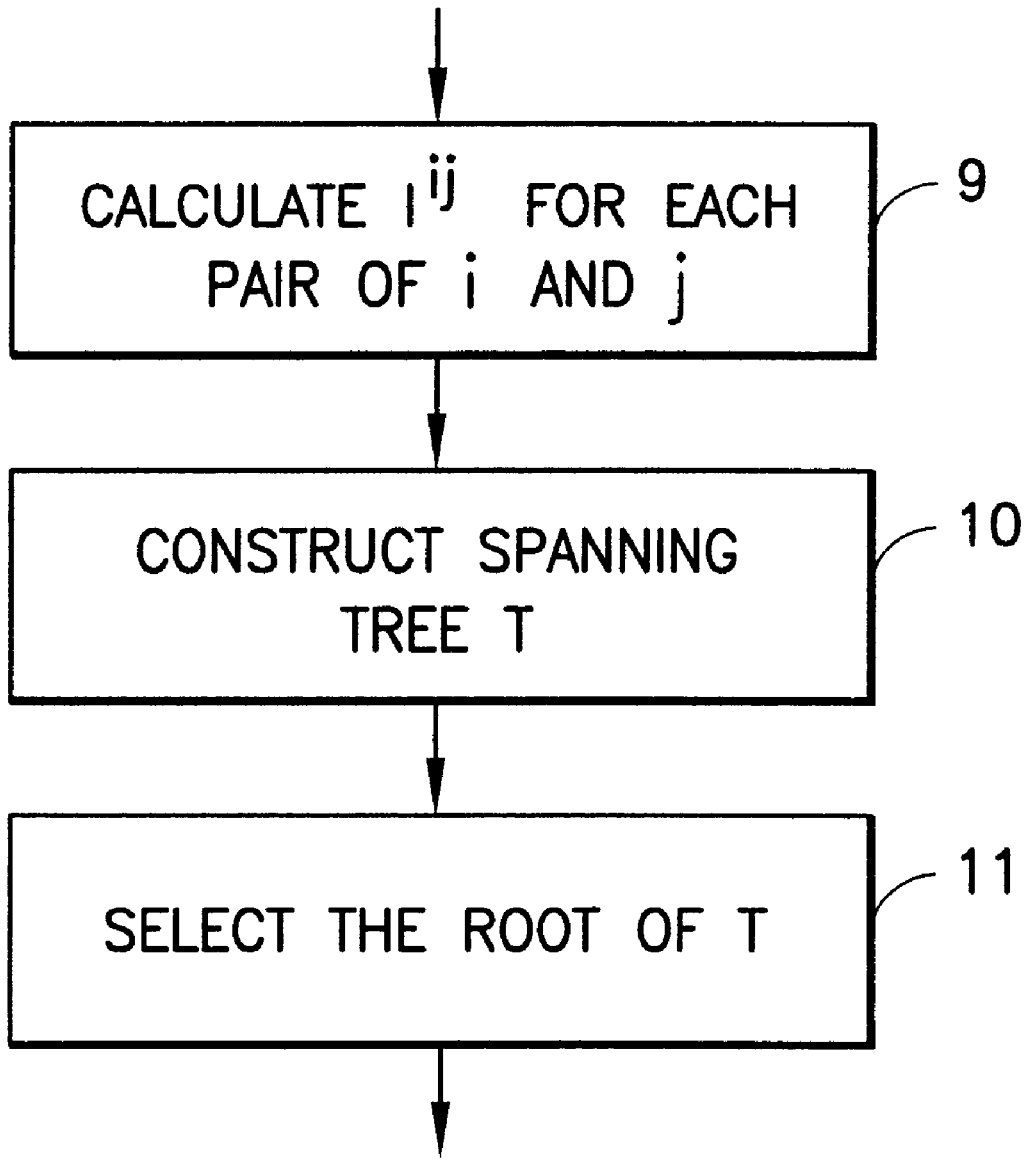

FIG. 2 (numerals 9–11) provides a flow chart of this procedure.

Procedure 2: Forecasting

Step 1. Forecast the demand of a product family $\hat{D}_{n+1}$ from historical sales $D_t (1 \leq t \leq n)$ by a statistical forecast.

Step 2. Forecast the feature ratio of $B^r$, $\hat{f}^r_{n+1}$ from $f^r_t$ ($1 \leq t \leq n$) by a statistical forecast, Step 3. Trace the arcs of T from the root to the leaves in the following way.

Step 3-1. Select an arc $e^{pq}$ one of whose end nodes, $B^p$ is visited already, and the other node $B^q$ is not. If there is no such an arc, go to Step 4.

Step 3-2. Forecast the joint distribution $\hat{J}^{pq}_{n+1}$ from $J^{pq}_t$ ($1 \leq t \leq n$) by a statistical forecast, Step 3-3. Apply a numerical algorithm such as the conjugate gradient method to $\hat{J}^{pq}_{n+1}$ and obtain $\tilde{J}^{pq}_{n+1}$, so that its mutual information is equal to $I^{pq}$ which was obtained at Procedure 1:Step 1, and $1^T \cdot \tilde{J}^{pq}_{n+1} = \hat{f}^p_{n+1}$ holds.

Step 3-4. Let $\hat{f}^q_{n+1} = \tilde{J}^{pq}_{n+1} \cdot 1$.

Step 4. Obtain the demand forecast of each BB from $\hat{D}_{n+1}$ and $\hat{f}^i_{n+1}$ ($0 \leq i < m$).

Figure 3:
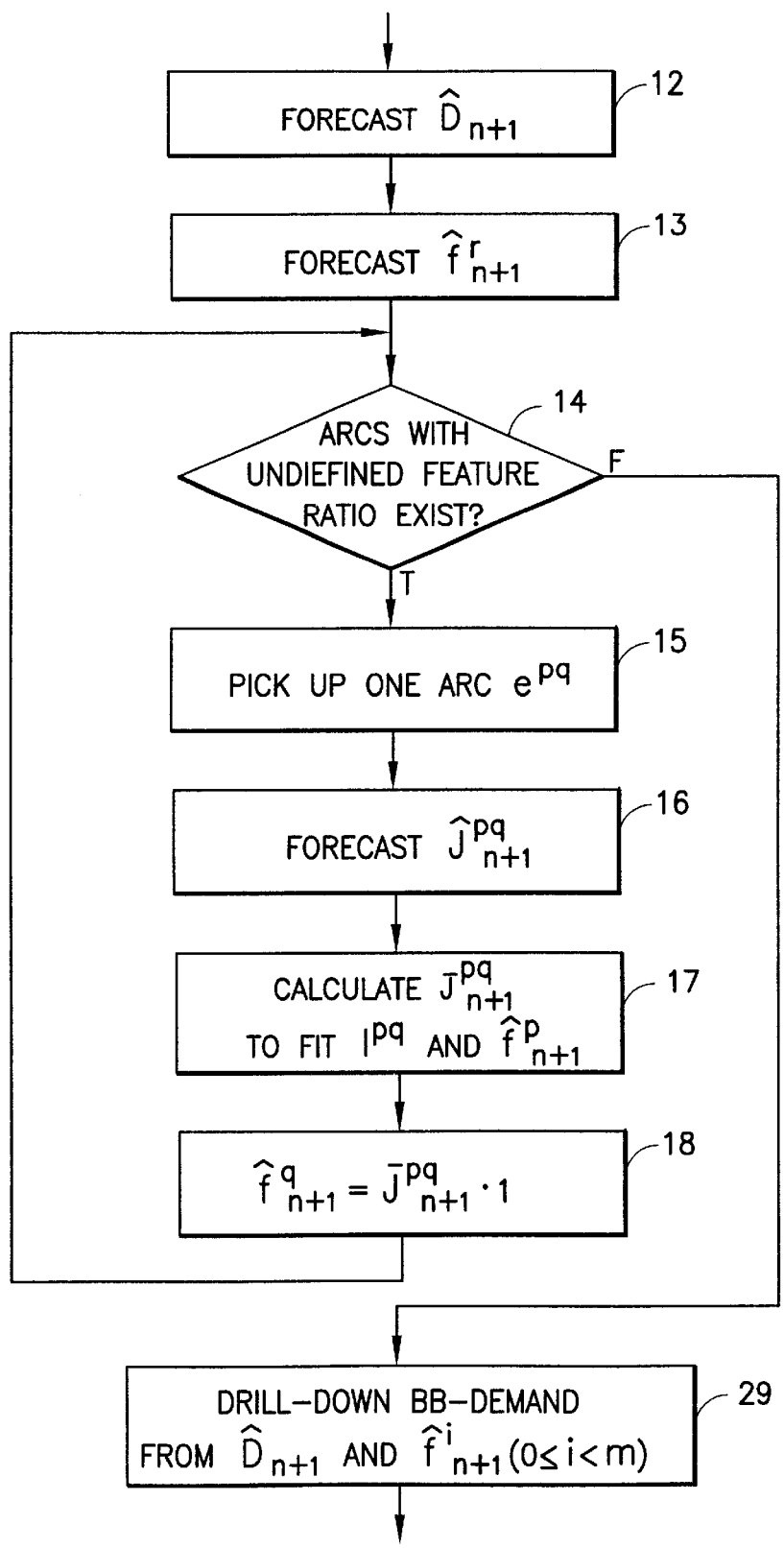

FIG. 3 (numerals 12–19) provides a flow chart of this procedure.

Procedure 3: Planning

Step 1. Obtain the adjustment on the feature ratios of a BB family based on business decisions as input.

Step 2. If no adjustment, terminate.

Step 3. Set the node corresponding to the BB family as the root of T.

Step 4. Follow Procedure 2:Step 3.

Step 5. Follow Procedure 2:Step 4. Go to Step 1.

Figure 4:
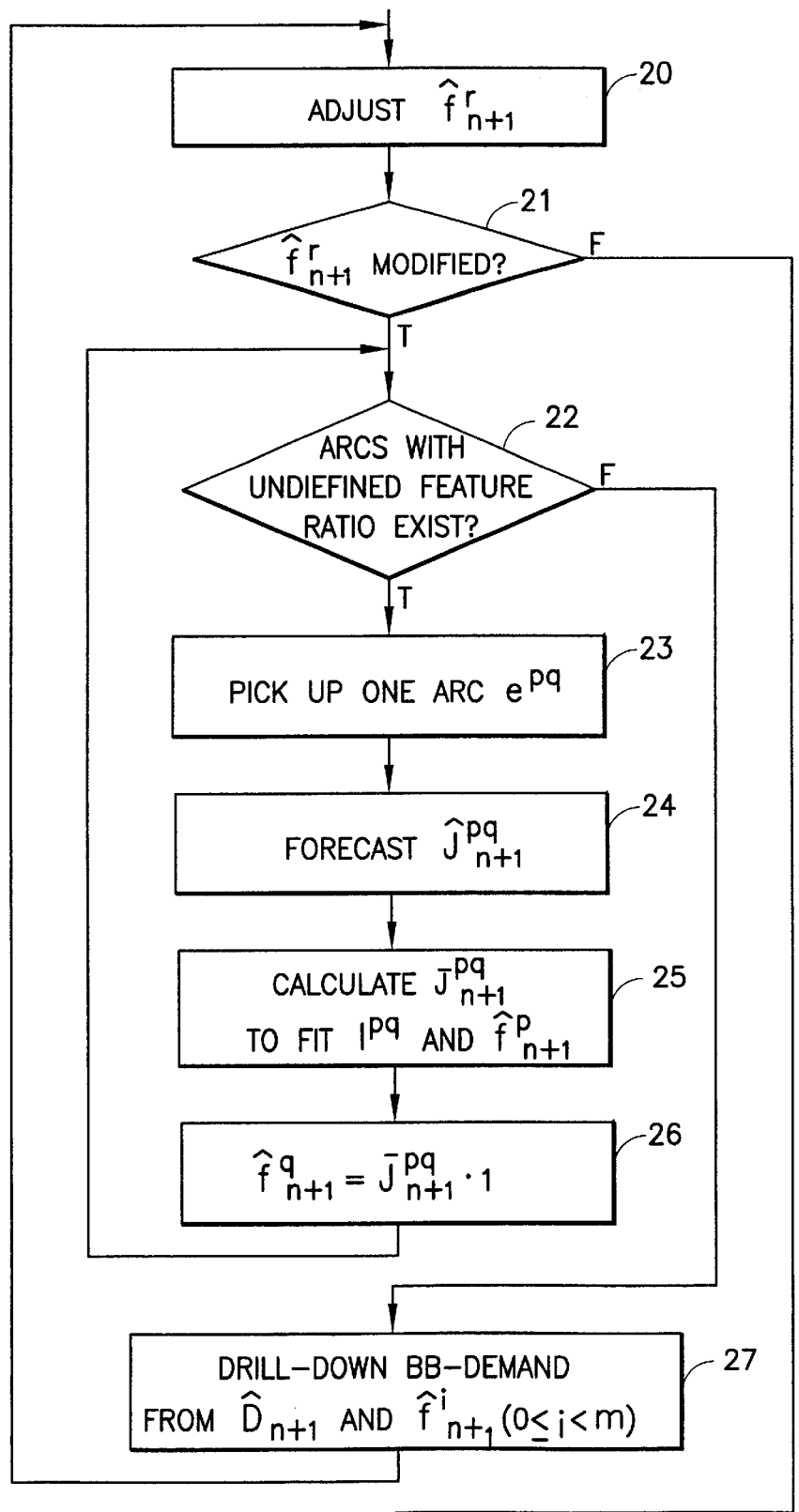
Figure 5:
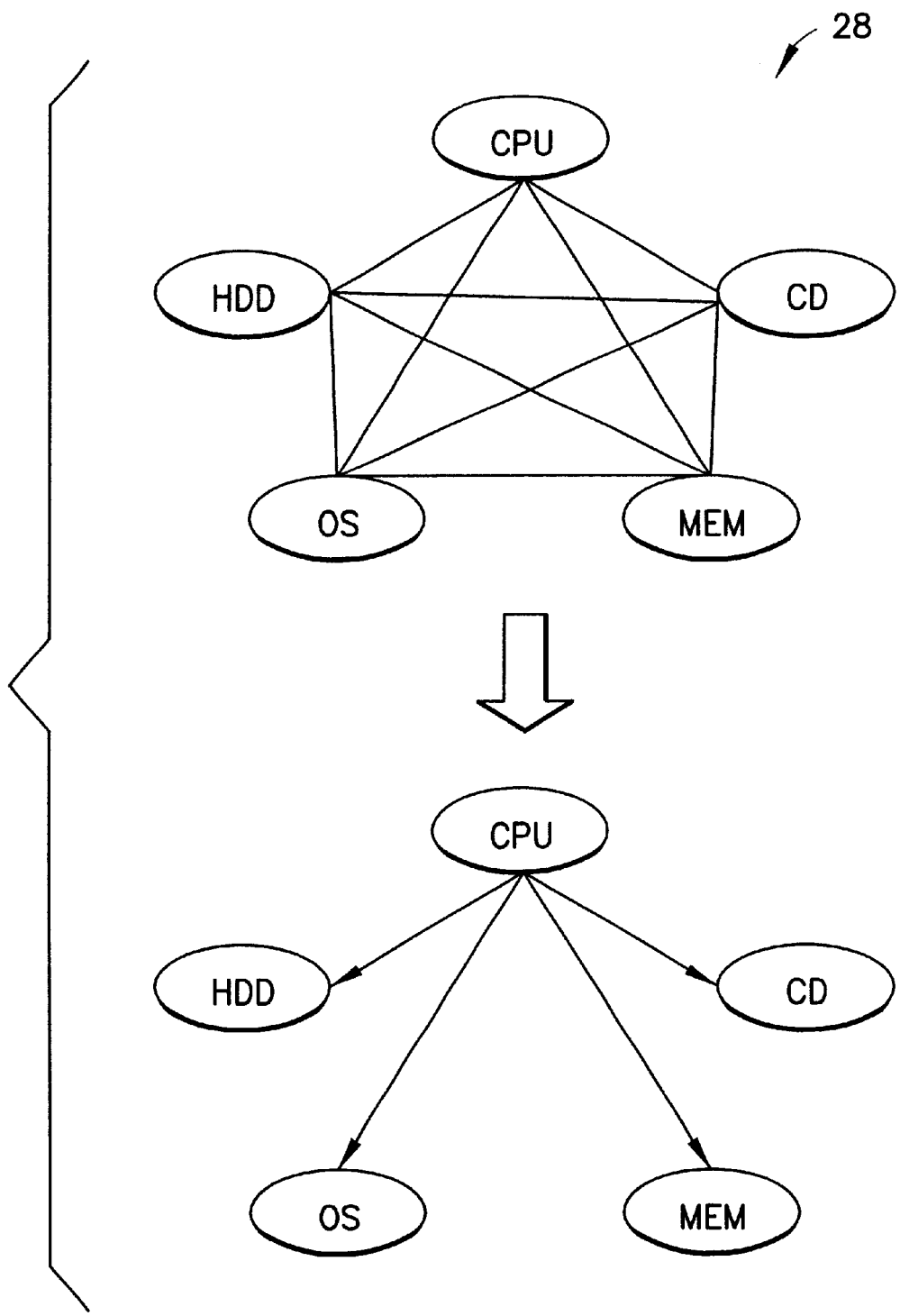

FIG. 4 (numerals 20–27) provides a flow chart of this procedure.

It is possible to accept the feature ratios of one or more BB families as input in Step 1. In that case, one of them is selected as the root, and Procedure 2:Step 3-4 is skipped when $B^q$ is one of the BB families whose feature ratios are specified as input. The overall result can vary according to the choice of the root, and the order the tree is traced.

Examples of Using Correlation Model

We first illustrate the idea using a spanning tree with an example of a product family of PC with multiple BB families, CPU, HDD(hard disk drive), MEMORY, CDROM, OS. Usually, all these BB families are correlated with each other as in FIG. 5 (numeral 28, top). It is too complicated and computationally expensive to preserve all these dependencies, and we approximate it with a tree as in FIG. 5 (bottom). Here, from the domain knowledge, CPU is the dominant BB family, and all other BB families are highly dependent on it. Thus we choose CPU as the root of the tree, focus on the feature ratio of CPUs first, and the feature ratios of other BB families are forecasted based on the relationship with the feature ratio of CPUs.

We then illustrate the method for adjusting feature ratios based on the correlation, with a simple example of a PC with two BB families, CPU(450M, 600M, 700M) and HDD(10G, 12G, 20G). The mutual information between CPU and HDD is calculated to be $I^{HDD-CPU}=0.160$ from the historical sales data. The feature ratio of CPUs in the next period is forecasted as $\hat{f}^{CPU}=(0.320, 0.540, 0.140)$, and the joint distribution $\hat{J}^{HDD-CPU}$ is forecasted as in TABLE 4.

TABLE 4

| $\hat{J}^{HDD-CPU}$ | 10G | 12G | 20G | TOTAL ($\neq \hat{f}^{CPU}$) |
|---|---|---|---|---|
| 450M | 0.180 | 0.100 | 0.060 | 0.340 |
| 600M | 0.080 | 0.250 | 0.150 | 0.480 |
| 700M | 0.020 | 0.070 | 0.090 | 0.180 |
| TOTAL | 0.280 | 0.420 | 0.300 | 1.000 |

The mutual information derived from TABLE 4 is 0.127, which is slightly different from $I^{HDD-CPU}$. The feature ratio of CPUs derived from TABLE 4 is (0.340, 0.480, 0.180), which is also different from $\hat{f}^{CPU}$.

Then we apply the conjugate gradient method to fit the joint distribution of TABLE 4 so that the inconsistency above is solved, and obtain another joint distribution $\tilde{J}^{HDD-CPU}$ in TABLE 5.

TABLE 5

| $\tilde{J}^{HDD-CPU}$ | 10G | 12G | 20G | TOTAL (= $\hat{f}^{CPU}$) |
|---|---|---|---|---|
| 450M | 0.184 | 0.083 | 0.053 | 0.320 |
| 600M | 0.075 | 0.298 | 0.167 | 0.540 |
| 700M | 0.017 | 0.052 | 0.071 | 0.140 |
| TOTAL (= $\hat{f}^{HDD}$) | 0.276 | 0.433 | 0.291 | 1.000 |

We can see that the joint distribution $\tilde{J}^{HDD-CPU}$ is consistent with $\hat{f}^{CPU}$ and $I^{HDD-CPU}$, and we obtain the forecasted feature ratio of hard disks as $\hat{f}^{HDD}=(0.276, 0.433, 0.291)$.

Given the forecast above, the planner of the PC company decides to adjust the feature ratio of CPUs into $\tilde{f}^{CPU}=(0.500, 0.400, 0.100)$ based on external information such as supply limitations and the inventory status. After applying Procedure 3, we obtain another joint distribution in TABLE 6.

TABLE 6

| $\tilde{J}^{HDD-CPU}$ | 10G | 12G | 20G | TOTAL (= $\tilde{f}^{CPU}$) |
|---|---|---|---|---|
| 450M | 0.299 | 0.131 | 0.071 | 0.500 |
| 600M | 0.064 | 0.204 | 0.132 | 0.400 |
| 700M | 0.016 | 0.039 | 0.045 | 0.100 |
| TOTAL (= $\tilde{f}$HDD) | 0.378 | 0.373 | 0.249 | 1.000 |

The joint distribution $\tilde{J}^{HDD-CPU}$ is again consistent with the specified feature ratio $\tilde{f}^{CPU}$, and now the feature ratio of hard disks is $\tilde{f}^{HDD}=(0.378, 0.373, 0.249)$. We can observe that, by maintaining the correlation, the feature ratio of hard disks is also adjusted in a way that the demand of low-end models is increased.

What is claimed:

1. A computer implemented method for demand planning of products, the method comprising the steps of:
    digitally constructing a configure-to-order operation/multiple building block environment;
    digitally forecasting the demand of building blocks within the constructed building block environment using a top-down approach, which considers sales volume of a product family, and feature ratios of the building blocks;
    digitally capturing dependencies among building blocks by combining methodologies of statistical forecast, categorical data analysis, and information theory;
    digitally forecasting demand quantity of each product family using dependencies among building block families comprising a pairwise correlation between any two building block families;

digitally propagating an adjustment by tracing a spanning tree nodes of which correspond to building block families, by starting from a most dominant building block family as a root node of the spanning tree;

using mutual information as an index for the pairwise correlation;

fitting a joint distribution for the building blocks to be consistent with the pairwise correlation; and establishing an efficient supply chain management.

2. A method according to claim 1, further comprising the step of normalizing feature ratios within a building block family.

3. A program storage device readable by a machine, tangibly embodying a program of instructions executable by the machine to perform method steps for demand planning of products, the method comprising the steps of:

constructing a configure-to-order operation/multiple building block environment;

forecasting the demand of building blocks within the constructed building block environment using a top-down approach, which considers sales volume of a product family, and feature ratios of the building blocks;

capturing dependencies among building blocks by combining methodologies of statistical forecast, categorical data analysis, and information theory;

forecasting demand quantity of each product family using dependencies among building block families comprising a pairwise correlation between any two building block families;

propagating an adjustment by tracing a spanning tree nodes of which correspond to building block families, by starting from a most dominant building block family as a root node of the spanning tree;

using mutual information as an index for the pairwise correlation;

fitting a joint distribution for the building blocks to be consistent with the pairwise correlation; and establishing an efficient supply chain management.

4. The program storage device according to claim 3, wherein the program of instructions further comprising the step of normalizing feature ratios within a building block family.

* * * * *